Dec. 28, 1965   TOMOYUKI KOHNO   3,226,274
METHOD OF MANUFACTURING ELECTRODES OF VARIABLE CONDENSER
Filed Sept. 25, 1961   2 Sheets-Sheet 1
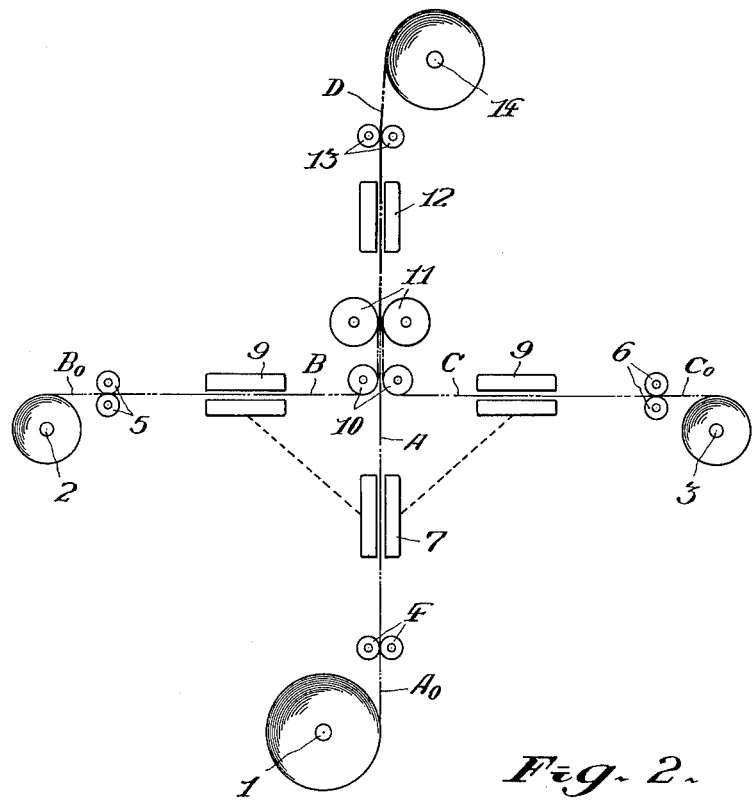
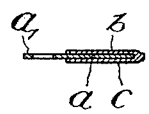
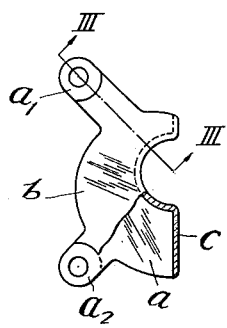
INVENTOR:
TOMOYUKI KOHNO
BY
Squire + Olcott
ATTORNEYS.

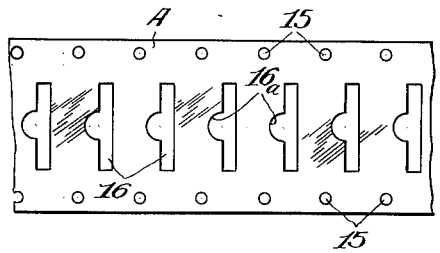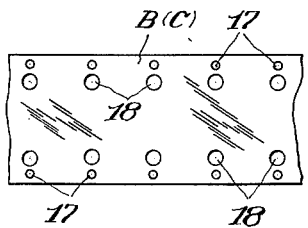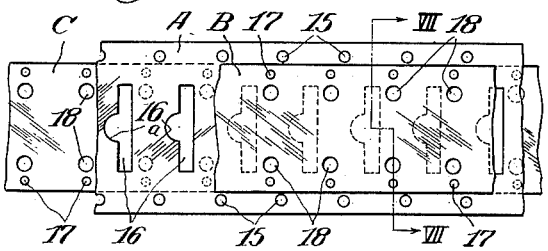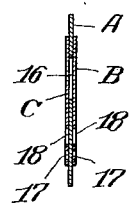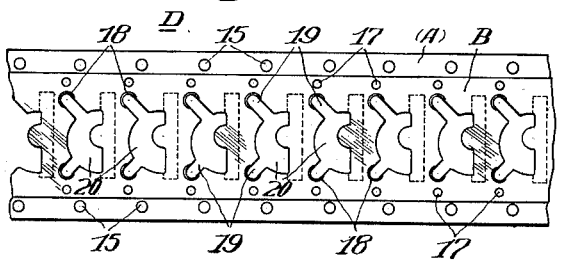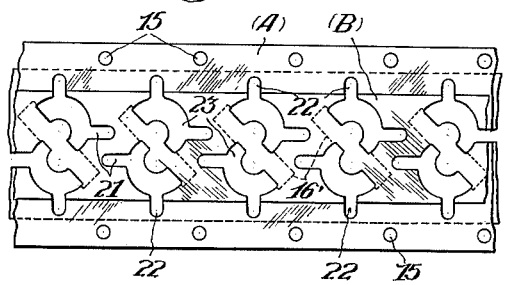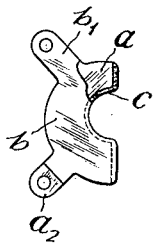

_United States Patent Office_

3,226,274
Patented Dec. 28, 1965

3,226,274
METHOD OF MANUFACTURING ELECTRODES OF VARIABLE CONDENSER
Tomoyuki Kohno, Tokyo, Japan, assignor to Mitsumi Denki Kabushiki Kaisha, Tokyo, Japan, a corporation of Japan
Filed Sept. 25, 1961, Ser. No. 140,499
Claims priority, application Japan, Oct. 3, 1960, 35/41,171
5 Claims. (Cl. 156—252)

The present invention relates to method of manufacturing electrodes coated with synthetic resin films on the both surfaces of a thin metal plate, particularly for use in miniature variable condensers.

The present invention is characterized in that the method comprises intermittently punching a uniformly spaced series of preliminary holes necessary for later manufacturing operations by means of a first punch press in a thin strip of sheet metal to be continuously fed, punching similarly preliminary holes by means of other punching presses in synchronism with said first punching press in two bands of synthetic resin films to be continuously fed, adhering said films to the both surfaces of said sheet metal, and thereafter punching insulated electrodes in semi-circular shape having two projecting terminal arms.

One object of the present invention is to provide a method of mass-producing continuously and efficiently, condenser electrodes each consisting of a thin metal plate sandwiched between two synthetic resin films.

It is another object to provide a simple and convenient method of manufacturing electrodes, particularly for a miniature condenser, in which a projecting portion of the metal plate at the tip of the terminal arm for one or two terminals is exposed, the remainder of the plate being completely coated on the both surfaces with synthetic resin films.

Further objects of the present invention will appear from the following detailed description of preferred embodiments thereof, illustrated in the accompanying drawings, in which:

FIG. 1 illustrates a process according to the present invention,

FIG. 2 is an enlarged plan view, partly in section, of a manufactured condenser plate, FIG. 3 is a sectional view taken on the line III—III of FIG. 2, FIG. 4 is a plan view of a fragment of a metal strip after a preliminary punching operation, FIG. 5 is a plan view of a fragment of a synthetic resin strip after a preliminary punching operation, FIG. 6 is a plan fragmentary view, partly broken away, of a composite strip comprising a synthetic resin film of FIG. 5 adhered to the both sides of the metal strip of FIG. 4, FIG. 7 is a sectional view taken on the line VII—VII of FIG. 6, FIG. 8 is a plan view of the scrap produced after final punching of the strip shown in FIG. 6, FIG. 9 is a plan view of a modified form of composite strip, similar to that of FIG. 8, having a different arrangement of punched holes, and FIG. 10 is a plan view, partly broken away, of a completed electrode with one arm insulated and the other arm exposed as punched from the composite strip of FIG. 9.

In FIG. 1 illustrating the process according to the present invention, a blank metal strip $Ao$ wound in a coil supported by shaft 1 is formed of thin sheet metal which is to be embodied in an electrode of a condenser. This sheet metal is intermittently fed by feed rollers 4 into a punch press 7 which successively punches a plurality of small guide holes 15 in a longitudinally extending row at a constant pitch along the both edges as shown at A in FIG. 4 and transversely extending slots 16 each having a semi-circular enlargement 16a in the central portion. The punched strip is fed into guide rollers 10, while films $Bo$ and $Co$ made of synthetic resin such as polyethylene are likewise intermittently fed by feed rollers 5 and 6 from coils supported by shafts 2 and 3, respectively, arranged to pass through punch presses 8 and 9 which operate in synchronism with the punch press 12 for the metal strip so that the films $Bo$ and $Co$ have small guide holes 17 and larger holes 18 formed adjacent to both edges of each strip at a pitch equal to that of the small guide holes 15 in the metal strip A as shown at B(C) in FIG. 5. The films B and C are thereafter fed between spaced guide rolls 10 so that the metal strip A is sandwiched between the films B and C (in this case) the guide holes 15 along the both edges of metal strip A and the guide holes 17 in the synthetic resin films B and C are maintained in register as shown in FIG. 6 by suitable mechanical or electromagnetic control), and then the films B and C are pressed against the metal strip A by press rolls 11 accompanied by heating if necessary, and adhered to both surfaces of the metal strip A as shown in FIGS. 6 and 7.

Thereafter the composite strip is fed into a punch press 12 above the press rolls 11. The composite strip consisting of metal strip A and films B and C adhered together is guided by perforations 15 and 17 to the punch press 12 which operates in synchronism with guide hole forming punch presses 7, 8 and 9, and an electrode of semi-circular shape is punched out of the composite strip. The electrode comprises two arms 19 adjacent to the slot 16 of the metal strip A as shown in FIG. 8 so that the completed electrode shown in FIGS. 2 and 3 is produced, the electrode being coated with synthetic resin films $b$ and $c$ on the both surfaces of the thin metal plate $a$. The edges of the films $b$ and $c$ at the tips $a1$ and $a2$ of the terminal arms were cut away by the preliminary holes 18 leaving the metal exposed to make connection easy. When this operation is completed scrap D shown in FIG. 8 is left, the scrap being fed by rollers 13 and wound in a coil supported on shaft 14.

In a modification shown in FIG. 9, slots 16' punched in a metal strip A are inclined at an angle of about 45° with respect to the longitudinal axis of the strip and in this case, as shown in FIG. 9, one of terminal arms 21 is parallel to the longitudinal axis of the composite strip, the other arm 22 extending laterally so that the terminal arm 21 remains insulated as shown at $b1$ in FIG. 10 and the terminal arm 22 is exposed as shown at $a2$.

Although the invention has been disclosed and illustrated with reference to particular applications, the principles involved are susceptible of numerous other applications which will be apparent to persons skilled in the art. The invention is, therefore, to be limited only as indicated by the scope of the appended claims.

I claim:
1. The method of forming a metal plate of predetermined configuration with both sides covered by insulation except for a predetermined area which is exposed, said method comprising the steps of:
  punching a first series of guide holes along an edge portion of a metal strip;
  punching a second series of guide holes along an edge portion of each of two separate strips of plastic film with the same pitch as said first-named series of guide holes;
  punching a third series of holes in at least one of said strips of film with the same pitch as said guide holes, the holes of said third series being located to produce said predetermined area of each metal plate which is to be exposed;
  maintaining all of said guide holes in register;

adhering each of said strips of film to one side of said metal strip to form a composite strip consisting of said metal strip sandwiched between said strips of film with said guide holes in register; and punching said metal plate from said composite strip.

2. The method according to claim 1, in which the holes of said third series are punched simultaneously with the holes of said second series.

3. The method according to claim 1, wherein all of said punching steps are performed in synchronism.

4. The method according to claim 3, wherein all of said strips are intermittently fed, said punching steps being performed during successive intervals when all of said strips are stationary.

5. The method according to claim 1, comprising the further step of punching a blank out of an area of said metal strip positioned with reference to said first series of guide holes simultaneously with the punching of said first series of guide holes for reducing the amount of metal in the scrap resulting from the punching of said metal plate from said composite strip.

References Cited by the Examiner
UNITED STATES PATENTS

| | | | |
|---|---|---|---|
| 1,996,835 | 4/1935 | Scholl | 156—253 |
| 2,568,458 | 9/1951 | Nichols | 156—253 |
| 2,688,582 | 9/1954 | Phair et al. | 156—252 XR |
| 3,032,463 | 5/1962 | Morgan | 156—253 |

EARL M. BERGERT, *Primary Examiner.*

L. PEAR, *Examiner.*